Nov. 18, 1969  V. F. J. MARCOUX  3,478,727
ROTARY COMBUSTION ENGINE
Filed Dec. 19, 1967  4 Sheets-Sheet 1

INVENTOR,
VERNON F. J. MARCOUX

BY *Kenyon Palmer Stewart & Estabrook*

ATTORNEYS

Nov. 18, 1969  V. F. J. MARCOUX  3,478,727
ROTARY COMBUSTION ENGINE
Filed Dec. 19, 1967  4 Sheets-Sheet 2

INVENTOR,
VERNON F. J. MARCOUX.
BY *Kernon Palmer Stewart & Estabrook*
ATTORNEYS Nov. 18, 1969  V. F. J. MARCOUX  3,478,727
ROTARY COMBUSTION ENGINE
Filed Dec. 19, 1967  4 Sheets-Sheet 3

INVENTOR
VERNON F. J. MARCOUX

BY Kemon Palmer Stewart & Estabrook

ATTORNEYS

Nov. 18, 1969  V. F. J. MARCOUX  3,478,727
ROTARY COMBUSTION ENGINE
Filed Dec. 19, 1967  4 Sheets-Sheet 4
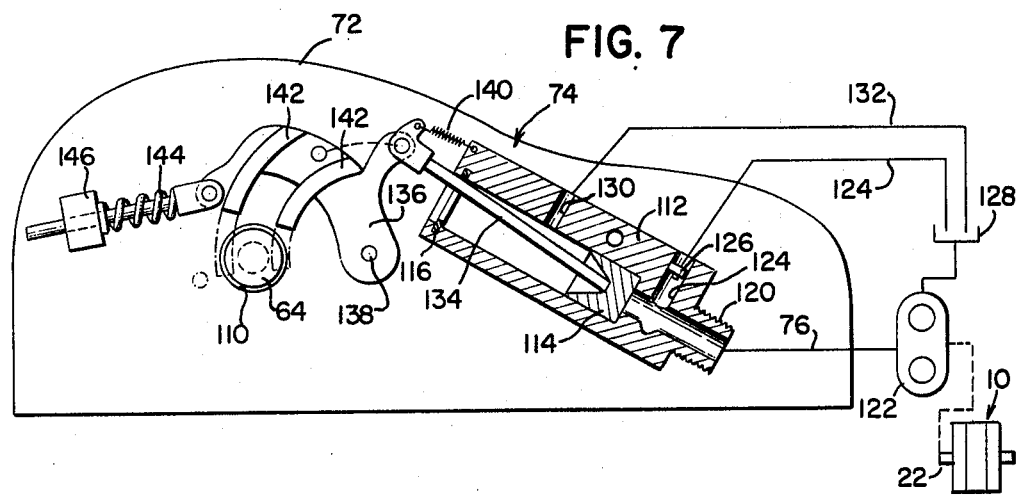
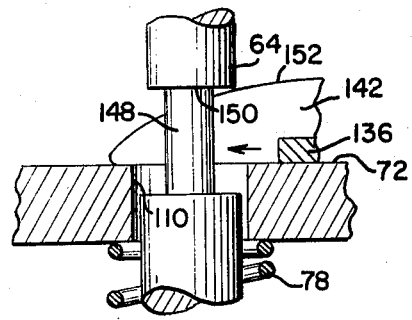
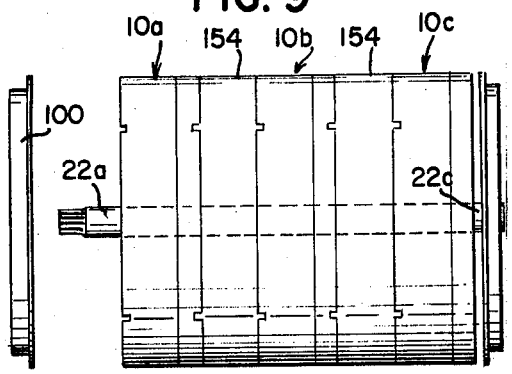
INVENTOR,
VERNON F. J. MARCOUX
BY *Kenon Palmer Stewart & Estabrook*
ATTORNEYS

United States Patent Office 3,478,727
Patented Nov. 18, 1969

3,478,727
ROTARY COMBUSTION ENGINE
Vernon F. J. Marcoux, 1617 Morgan Ave., Saskatoon, Saskatchewan, Canada
Filed Dec. 19, 1967, Ser. No. 691,879
Int. Cl. F02b 53/06, 53/10, 55/14
U.S. Cl. 123—15
6 Claims

ABSTRACT OF THE DISCLOSURE

A rotary internal combustion engine having a cylindrical rotor enclosed in a cylindrical chamber to define an annular space therebetween. The rotor has a radial member projecting therefrom which bridges the annular space. Rotary valves, mounted in the housing, periodically bridge the annular space to cooperate with the radial member and form expansible chambers for the intake, compression, power and exhaust strokes of the engine. At higher engine speeds, the rotary valves are blocked in a non-bridging position and the requisite chambering is effected through the inertia of gas in the annular space.

Background of the invention

This invention relates generally to internal combustion engines and more particularly to internal combustion engines of a type having a rotary piston.

There are disclosed, in the prior art, many internal combustion engines of the rotary piston type. Generally these engines have a cylindrical chamber and a non-cylindrical rotor mounted therein, generally rotating about an axis offset from the axis of symmetry of the chamber. In other cases, a non-cylindrical chamber houses a cylindrical rotor so that, in either case, expansible chambers are effected between the rotor and the housing through the asymmetrical configuration and/or positioning of the chamber and/or rotor.

In other prior art devices, such as in the combustion cycle turbine engine disclosed in U.S. Patent 2,827,024 to Arietti, rotary engines are provided wherein cylindrical chamber encloses a coaxially mounted cylindrical rotor. The rotor has projections thereon which bridge an annular space formed between the rotor and the periphery of the chamber and the expansible chambering is effected by the incorporation of rotary valves which periodically bridge the annular space.

Summary of the invention

This invention relates generally to the latter, coaxially mounted cylindrical rotor-chamber type of rotary engine described above and provides an improved rotary engine and a greater efficiency and flexibility over those disclosed in the prior art.

The invention provides a rotary engine for internal combustion engines which is simple in construction and has, as an advantage over prior art, internal combustion reciprocating engines and rotary offset axis engines, smooth running, relatively quiet operation provided through the symmetrical balanced motion thereof, thereby eliminating the need for sound and shock suppressors as well as heavy gauge structural supports.

An engine in accordance with this invention, because of the relatively small number of moving parts, also requires minimum maintenance over longer periods of time.

These advantages and objects of this invention are provided by furnishing a rotary engine having a cylindrical chamber enclosing a cylindrical rotor coaxially therein. The periphery of the chamber and the rotor define an annular space therebetween. The radial member projecting from the rotor bridges the annular space and, in conjunction with rotary valves disposed around the periphery of the chamber and extending into the space, cooperate to form expansible chambers.

The invention further provides means to block the action of the rotary valves in a non-operating position at higher engine speeds, thereby providing an engine with a minimum of moving parts under these conditions.

The objects and other advantages of this invention will become better understood to those skilled in the art by reference to the following detailed description when viewed in light of the accompanying drawings wherein:

FIGURE 7 is an enlarged elevational detail, partly in section, of a component of the engine of FIGURE 1;

FIGURE 8 is an elevational fragmentary sectional view, further enlarged, of a portion of a component illustrated in FIGURE 7; and FIGURE 9 is a reduced elevational side view of a plurality of engine units in accordance with the invention assembled for ganged operation.

Description of the preferred embodiment

Figure 1:
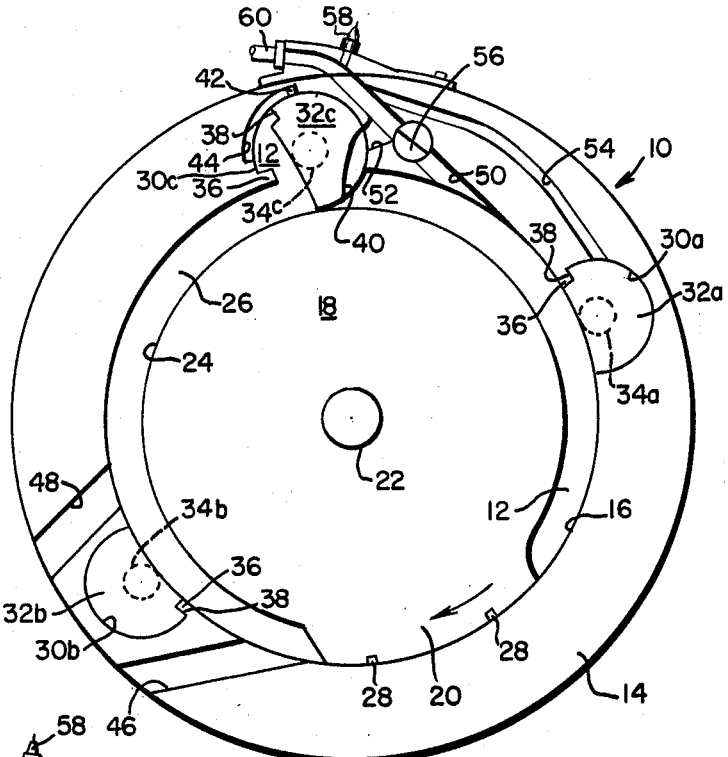
FIGURE 1 is an elevational view of an engine unit constructed in accordance with the invention with an end cover thereof removed.

Referring now to FIGURE 1 of the drawings, a housing, shown generally at 10, comprises a first end plate 12 having an annular member 14 disposed thereon to form therewith a recess defined by a cylindrical inner wall 16. The end plate 12 and the annular wall member 14 are preferably integral, formed by machining a cylindrical casting or forging. A rotor 18, having a projecting member 20 extending from the periphery thereof, is disposed within the recess formed by the wall 16 and is mounted to a drive shaft 22 which, in turn, is rotatably mounted concentrically through the housing 10. The rotor 18 is provided with a generally cylindrical peripheral wall 24 which, in conjunction with the inner wall 16 of the annular member 14, defines an annular chamber 26 therebetween. The projecting member 20 bridges the space formed between the walls 16 and 24 in sliding contact with the wall 16 to interrupt the annulus formed by the chamber 26. Seals 28, of any type known in the art, are provided in the periphery of the projecting member 20 to provide a sliding seal between that member and the wall 16.

The annular member 14 is provided with semi-cylindrical longitudinally extending bores 30a, 30b, and 30c therein, the bores being disposed to intersect the wall 16. Semi-cylindrical rotary valve members 32a, 32b and 32c are mounted in the corresponding bores 30a, 30b and 30c on valve shafts 34a, 34b and 34c which are, in turn, rotatably mounted in the housing 10. Stops 36 extend into each of the bores 30a, 30b and 30c and engage radially extending abutments 38 on each of the rotary valves 32a, 32b and 32c to provide a counterclockwise limit to the movement of the rotary valves in the position of the valves 32a and 32b in FIGURE 1. The rotary valve 32c is further provided with a recess comprising an arcuate slot 40 in a portion of the cylindrical surface thereof and a projecting key 42 disposed in spaced relation thereto on another portion of the cylindrical surface thereof. The key 42 extends into an arcuate slot 44 formed in the cylindrical surface of the bore 30c and combines therewith to provide a clockwise stop to the motion of the valve 32c in the position illustrated in FIGURE 1.

The annular member 14 is further provided with air exhaust and inlet bores 46 and 48 disposed therethrough proximate opposite sides of the valve 32b, and a fuel inlet bore 50 proximate the downstream side of the valve 32c. The fuel inlet bore 50 is intersected by a combustion chamber 52 which communicates with the arcuate slot 40 in the valve 32c in the position shown in FIGURE 1, and an air inlet conduit 54 which communicates with the bore 30a. A combustion control valve 56 is disposed in the fuel inlet bore 50 downstream of the intersection of the combustion chamber 52 and the conduit 54 therewith, and, in the position of FIGURE 1, provides communication directly to the annular chamber 26. Ignition means, comprising an ignition plug 58, connected to a suitable source of electric current (not shown) as is known in the art, is disposed in communication with the fuel inlet bore 50 upstream of the intersection of the combustion chamber 52 and the conduit 54. The plug 58 may comprise a spark plug, glow plug or other suitable ignition means as is common in the art. The fuel inlet bore 50 is connected, through a fuel line 60, to a suitable source of fuel supply such, for example, as a positive displacement fuel pump (not shown). Although there are many pumps known in the art which may be suitable for this purpose, it is preferred that a positive displacement pump such as that disclosed in applicant's copending application Ser. No. 653,488, filed July 14, 1967, be used in conjunction with this invention. In the configuration shown in FIGURE 1, the rotor 18 and the valves 32a through 32c and 56 are positioned near the termination of the power-exhaust stroke.

Figure 2:
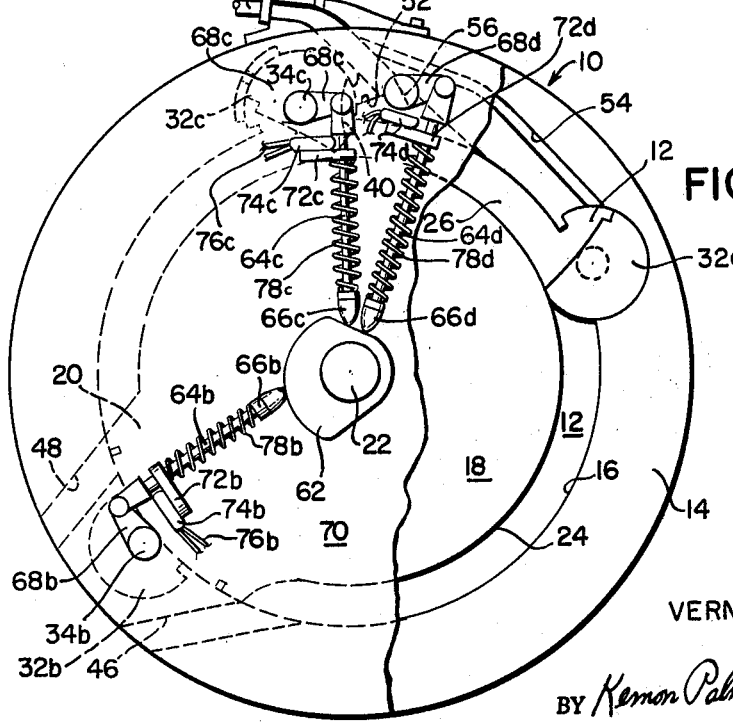
FIGURE 2 is a view similar to FIGURE 1, showing a portion of the end cover and associated structure in place and illustrating a portion of the end surface operating mechanism of the engine.

Referring now more particularly to FIGURE 2, the rotor and valves are illustrated at the beginning of the intake-compression stroke. As can be seen by reference to the figure, the rotor 18 and the projecting member 20, in conjunction with the rotary valves 32a through 32c positioned as shown, define means to vary the volume of the chamber 26.

In FIGURE 2, a portion of the actuating means for the rotary valves 32b and 32c and the combustion control valve 56 is illustrated. These means comprise a cam 62 mounted to the drive shaft 22 and radially extending push rods 64b, 64c and 64d. The push rods 64b, 64c and 64d have cam-engaging cam followers 66b, 66c and 66d on one end thereof and are pivotally attached to cam shaft links 68b, 68c and 68d on the other end thereof. The cam shaft links 68b and 68c are fixedly mounted to the respective cam shafts 34b and 34c and the link 68d is fixed to the end of the combustion control valve 56 to provide rotation thereof with longitudinal movement of the push rods 64b, 64c and 64d. In FIGURE 2, a fragmentary portion of a second end plate 70, enclosing the chamber 26, is shown installed. Push rod guides 72b, 72c and 72d are mounted on the end plate 70 and support thereon lockout mechanisms 74b, 74c and 74d which are, in turn, connected to an engine-driven pump through hydraulic lines 76b, 76c and 76d. The aforesaid lockout mechanism structure will be described in greater detail hereinbelow.

Compression springs 78b, 78c and 78d are disposed around the respective push rods between the push rod guides 72b, 72c and 72d and the cam followers 66b, 66c and 66d to normally bias the push rods 74b, 74c and 74d, respectively, against the cam 62. As can be seen by reference to FIGURE 2, the cam 62, at its maximum radius, drives the push rods outwardly to pivot the valve in a counterclockwise direction and, at the minimum radius thereof, provides for inward radial movement of the push rod to rotate the respective valves in a clockwise direction.

Accordingly, by reference to FIGURE 2, it can be seen that the valve 32b is rotated to a full counterclockwise position with the cam follower 66b extending the push rod 64b from the maximum radius position of the cam 62. Similarly, with the cam follower 66c riding on the increasing radius portion of the cam 62, the valve 32c is being rotated in a counterclockwise direction and is illustrated in an intermediate condition. Similar motion is imparted through corresponding structure to the combustion control valve 56.

If greater lateral stability in the push rods 64a through 64d is required, additional push rod guides may be obviously provided radially inwardly of the guides 72a through 72d if so desired.

Figure 3:
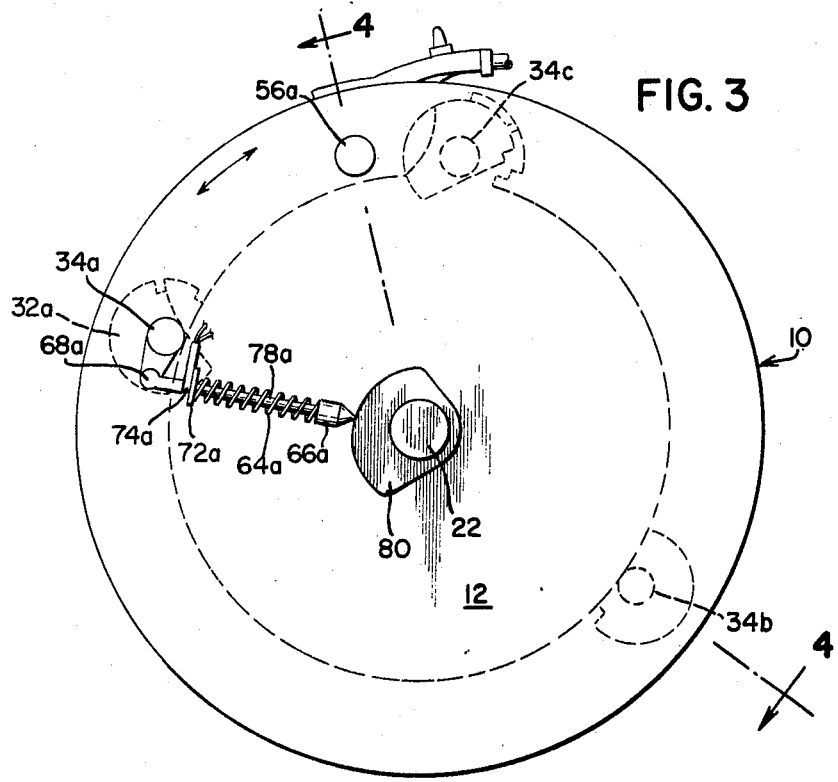
FIGURE 3 is an elevational view of the engine of FIGURE 2 viewed from the opposite end thereof.

Referring now more particularly to FIGURE 3, an elevational view of the engine from the opposite end of the view of FIGURE 2 is shown. A portion of the mechanism is illustrated in phantom in this view for purposes of clarity of illustration. The drive shaft 22 is provided with a cam 80. A push rod 64a, provided on one end thereof with a cam follower 66a riding on the cam 80, is pivotally connected to the cam shaft 34a by a cam shaft link 68a. A push rod guide 72a, having a lockout mechanism 74a mounted thereon, is disposed on the first end plate 12 and encompasses the push rod 64a. A compression spring 78a is disposed between the cam shaft guide 72a and the cam follower 66a to bias the follower against the surface of the cam 80. The above-described mechanism operates in the same manner as described for the push rods 64b, 64c and 64d to oscillate the valve 32a.

Figure 4:
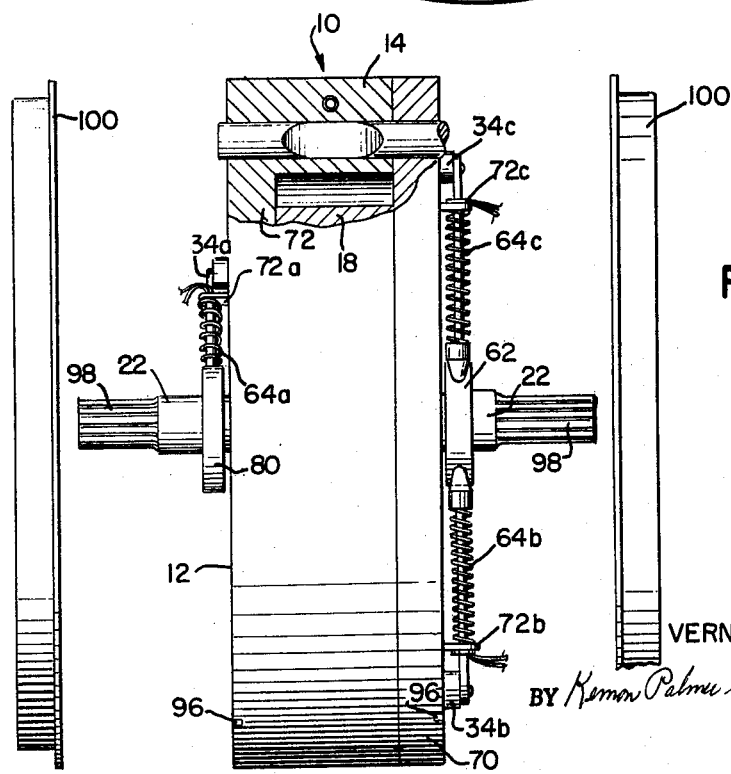
FIGURE 4 is a side elevational view of the engine of FIGURE 1, partly in section.

Referring now to FIGURE 4 of the drawings, the above-described components are illustrated in side elevational detail. In this figure, it is seen that the end plates 12 and 70 are provided with notches or recesses 96 in the outer periphery thereof for purposes to be described below. The shaft 22 is also provided with splines 98 for connection to power takeoff shafts or for other purposes to be described in greater detail below. Covers 100 are provided to enclose the mechanism external of the housing 10 when the engine is to be utilized in single-unit installations. Connection of the covers, as well as the various components of the housing 10 can be achieved through any suitable means known in the art, preferably by threaded fasteners disposed longitudinally through bores formed in the components (not shown).

Figure 5:
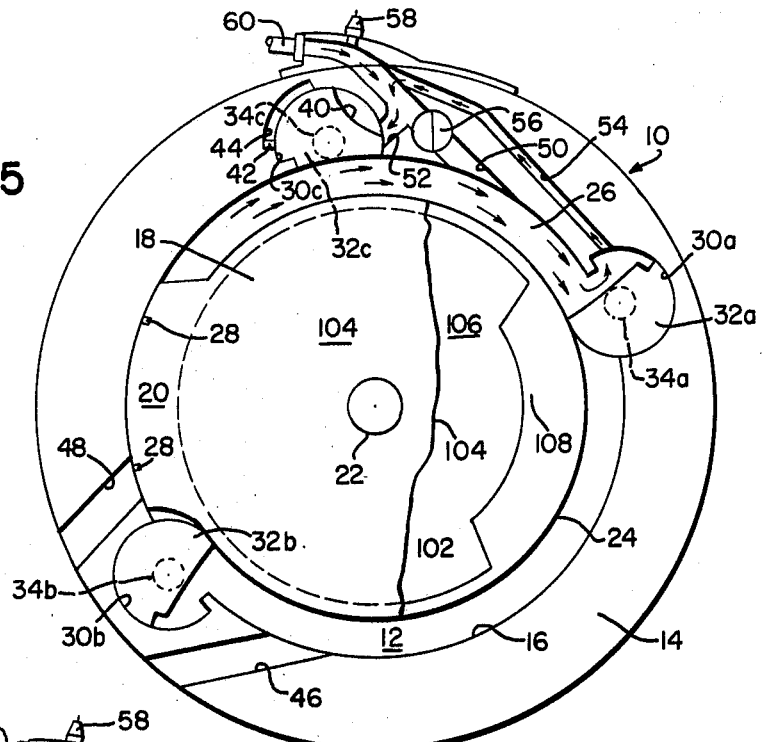
FIGURE 5 is a view similar to FIGURE 1 illustrating the structure of the rotor thereof partly broken away.

Referring now more particularly to FIGURE 5, the internal structure of the rotor 18 is illustrated. The rotor comprises a cylindrical shell 102 covered on the transverse surfaces thereof, by rotor-conforming plates 104 and 106. The shell 102, has, disposed in diametrically opposed relation to the projecting member 20, an inwardly projecting counterweight 108 which is so configured to exactly counterbalance the weight of the projecting member 20 and thereby balance the rotor 18. Suitable annular seals (not shown) of any type standard in the art may be provided on the outwardly facing surfaces of the plates 104 and 108 to contact the inward surfaces of the end plates 12 and 70 and provide a sliding seal therebetween. Such seals are well known to those skilled in the art and they are not described in great detail herein. The disposition of the rotor 18 and the valves 32a through 32c in FIGURE 5 corresponds to the compression cycle of the operation of the engine.

Figure 6:
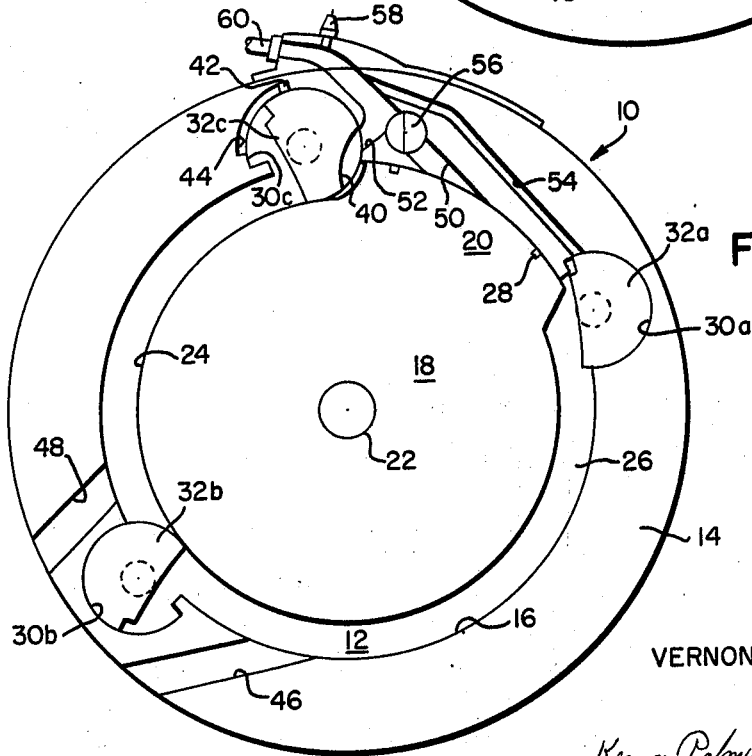
FIGURE 6 is a view similar to FIGURE 1, showing the engine at the initiation of the combustion cycle.

In FIGURE 6, the engine is illustrated at ignition commencing the power cycle of the operation of the engine.

Referring now more particularly to FIGURE 7 of the drawings, one of the push rod guides 72 is shown in plan view. Since each of the push rod guides 72a through 72d and the apparatus associated therewith are identical, the structure of each will be described by reference to FIGURE 7 utilizing numbers corresponding to the components of each omitting the suffix. The push rod 64 traverses the push rod guide 72 through a bore 110. The lockout mechanism, shown generally in this figure at 74, comprises a cylinder 112 having a piston 114 slidably mounted therein. The piston 114 is contained in the cylinder housing 112 by a lock ring 116 at one end thereof, and the conduit 76 provides fluid communication to the other end of the piston through a nipple 120. As is shown schematically, the conduit 76 is connected to a positive displacement hydraulic pump 122 which, in turn, is connected mechanically to the drive shaft 22 of the engine. A bypass conduit 124 having a metering orifice 126 disposed therein is communicative with the conduit 76 and a sump 128. The transverse orifice 130 communicates through a conduit 132 with the sump and is in communication with the interior of the cylinder housing 112. A piston rod 134 connects the piston 114 to a toggle 136 which is pivotally mounted to the push rod guide 72 at 138. A tension spring 140 biases the toggle 136 in the position illustrated. A pair of cams 142 are mounted on the toggle 136 and are disposed to straddle the push rod 64 when the toggle is rotated as shown in phantom lines. A compresion spring and spring guide 144, pivotally mounted to the push rod guide 72 at 146, is pivotally connected to the toggle 136 to, in cooperation with the tension spring 140, normally bias the toggle 136 in the illustrated position.

With reference now to FIGURE 8, the elevational view of a portion of the apparatus of FIGURE 7 is shown in enlarged detail. The push rod 64 is provided with a reduced portion 148, which portion terminates in an upper transverse abutment 150. The cam 142 has an upwardly sloping surface 152 which, when moved in the direction of the arrow, displaces the push rod 64 upwardly to block it in that position.

When the piston 114 (FIGURE 7) is actuated by hydraulic pressure in operation, as will be described in greater detail below, the piston rod 134 causes the toggle 136 to rotate toward the position indicated in phantom in FIGURE 7. As the cams 142 straddle the push rod 64 and enter the recess 148 therein, the cam surface 152 contacts the abutment 150 and either moves and blocks or blocks the push rod 64 in the upward position depending upon the initial position of the push rod at the time of actuation of the toggle 136. With reference to FIGURES 1 through 4, such motion blocks the push rods 64a through 64c in such a manner that the push rods and the cam followers 66a through 66c are held at the maximum radius of the respective cams, thereby blocking each of the valves 32a through 32c in the non-chamber bridging condition as it is exemplified by valves 32a and 32b in FIGURE 1 and valve 32c in FIGURE 5.

In operation, and by reference now to FIGURE 1 in particular, the rotor 18 is rotated in the direction indicated by the arrow by a starter motor, crank, or like mechanism. As illustrated in that figure, gas is expelled through the exhaust port 46 on the upstream side of the projecting member 20. The arrangement illustrated in FIGURE 1 is also the power stroke of the engine as will be described in greater detail below.

Referring now to FIGURE 2, the rotor 18 has continued rotation so that the projecting member 20 is now positioned past the exhaust port 46, blocking the inlet port 48. The valve 32a has assumed a chamber-bridging position and the valve 32c has commenced rotation towards a non-bridging condition, thereby configuring the engine for the compression cycle of the operation. The combustion control valve 56 has started to close and, due to the counter-clockwise rotation of the rotary valve 32c, communication through the combustion chamber 52 through the slot 40 is being restricted. Also, due to the clockwise rotation of the valve 32a to the chamber-bridging position, the bypass conduit 54 is put into communication with the chamber 26.

Turning now to FIGURE 5, the projecting member 20 has rotated further in a clockwise direction, thereby reducing the volume of the chamber formed between the advancing edge of the projecting member and the valve 32a and compressing the gaseous mixture therein. The valve 32c is now rotated in a full counterclockwise position, thereby completely blocking communication between the combustion chamber 52 and the chamber 26 while the valve 56 is rotated to fully block direct communication through the bore 50. Air being compressed in front of the advancing projecting member 20 is transmitted, as shown by arrows, through the air inlet conduit 54 into the combustion chamber 52. Simultaneously, fuel is injected into the mixture through the fuel line 60 and bore 50. The valve 32b, rotated by the cam and push rod apparatus associated therewith, assumes a chamber bridging position behind the advancing projecting member 20.

In FIGURE 6, the projecting member 20 has reached a position coinciding with the combustion chamber 52 and the valve 32a is rotated by the associated cam and push rod structure toward a non-chamber bridging position simultaneously blocking further communication with the air inlet conduit 54. The valve 32c has rotated to the chamber bridging position behind the advancing projecting member 20, thereby providing communication directly from the combustion chamber 52 to the chamber 26 through the arcuate slot 40. The plug 58 is energized at this point igniting the air-fuel mixture and the power stroke of the engine commences with the expanding ignited gases driving the projecting member 20 in the clockwise direction. Simultaneously, burnt gas from the preceding cycle, trailing the projecting member 20, is exhausted through the exhaust port 46 due to the interaction between the valve 32b, which has assumed a chamber bridging position, and the advancing projecting member 20.

Returning again to FIGURE 1, the power stroke of the engine is shown at the termination thereof with the valve 32c remaining in the chamber bridging position and the combustion control valve rotated to provide further communication between the combustion chamber 52 and the chamber 26 through the bore 50. The engine continues in operation with the cycles recurring as described above.

As the speed of the rotor increases under the driving influence of the expanding gases, inertial forces are built up in the gases, at which point the valving provided by actuation of the valves 32a through 32c is no longer required. For example, assuming that each of the valves 32a through 32c are blocked in their non-bridging position, the action of the projecting member 20 on the annulus of air preceding it will result in substantial compression of a portion thereof which, when transmitted by the combustion control valve 56 in its open position (FIGURE 1), will result in compression in the combustion chamber 52. Similarly, the projecting member 20 approaches the exhaust port 46, burnt gases preceding the member will be exhausted through the exhaust port due to inertial of the air preceding the burnt gases. Ignition of the fuel in the combustion chamber 52 by the plug 58 then occurs and the expanding gases are released behind the advancing projecting member 20 through the open combustion control valve 56 as the member proceeds thereby. As a further illustration of the foregoing example, with the engine operating at, say, 5,000 r.p.m.'s, one can assume that each of the valves 32a, 32b and 32c are blocked in their non-bridging position, the action of the combustion is in line of force to that of the projecting member 20 and thus forces said member to continue to move clockwise in its rotation so that cold air which had been previously drawn in through the inlet port 48 encounters the hot gases leaving the combustion chamber 52. The hot gases act as a retainer. The speed of the projecting member 20, forcing the cold air against the hot gases which will not have been completely expelled through exhaust port 46, constitutes a portion of the air to be compressed in the combustion chamber 52. The compressed air combines with injected fuel and ignition will result in combustion occurring in said combustion chamber to continue each cycle of operation.

In the configuration illustrated, a valved operation is contemplated in an engine speed range of between 0 and 5,000 r.p.m. The lockout mechanisms 74a through 74d are therefore preferably set to be actuated as described above at an oil pressure corresponding to approximately 4500 r.p.m.

The blocking of the rotary valves 32a through 32c and the combination control valve 56 at high speed conditions is accomplished as follows:

Referring particularly to FIGURES 7 and 8, the pump 122, driven by the engine 10, transmits hydraulic fluid to the cylinder housing 112 through the nipple 120. Fluid is bypassed through the bypass conduit 124 and the metering orifice 126 to the sump 128 for recirculation through the aforedescribed circuit. At low speeds, the quantity of fluid bypassed through the bypass conduit is such that the piston 114 remains in the illustrated position under the influence of the springs 140 and 144 so that the toggle 136 and cams 142 remain in the position illustrated in FIGURE 7. The metering orifice 126 is adjusted so that, when the engine speed reaches a value sufficient to operate without the valving action of the valves 32a through 32c and the combination control valve 56 as described above, the pressure acting on the piston 114 increases to a value sufficient to overcome the bias in the springs 140 and 114. At this point, the toggle 136 rotates in a counterclockwise direction and, as best seen by FIGURE 8, the cams 142 move in the direction of the arrows thereby blocking or moving and blocking the push rods 64 in the non-cam engaging position as was described above. The pressure against the piston 114 is limited to a maximum value by the uncovering of the transfer conduit 130 which also communicates flow directed against the piston to the sump 128. With the push rods in the blocked position, the valves 32a through 32c and 56 remain blocked and such condition is maintained until the speed of the engine is reduced to a value that, through reduction of the volume and the attendant reduction in pressure of fluid transmitted by the pump 122, the spring biasing force against the piston 114 overcomes the fluid pressure force against the face of the piston and the blocking apparatus returns to its normal position. With return of the blocking apparatus to the position illustrated, the cams 142 are withdrawn from the recess 148 and the push rods 64 are free to re-engage the surfaces of the respective cams and again actuate the valves 32a through 32c and 56 as required.

By reference now to FIGURE 9, a plurality of engine units are shown in ganged relationship. Spacers comprising annular rings 154 are disposed between adjacent units and are provided with projecting tabs 156 thereon which engage the recesses 96 in the housings 10 of the respective engines. The drive shafts 22a through 22c of the engines are interconnected by means such, for example, as splined tubular couplings (not shown) engaging the splines 98 in the respective drive shafts. Due to the flat, disc-like configuration provided by this invention, it is obvious that engines built in accordance therewith may be ganged as needed to provide the required horsepower output with considerable ease and flexibility.

What has been set forth above is intended as exemplary to enable those skilled in the art in the practice of the invention. It should, therefore, be understood that, within the scope of the appended claims, the invention may be practiced other than as specifically described.

What is new and therefore desired to be protected by Letters Patent of the United States is:

1. An internal combustion engine comprising:
   a housing;
   a cylindrical chamber in said housing;
   a cylindrical rotor coaxially disposed in said chamber to define therewith an annular space of substantially constant cross-sectional area around the periphery thereof;
   a radial member projecting from the periphery of said rotor to extend in sliding contact to the wall of said chamber;
   first, second and third rotary valve members mounted in spaced relation to one another around said housing, means to oscillate said valve members from a first position bridging said annular space in sliding contact with said rotor to a second position retracted in said housing to provide passage of said radial member as it rotates thereby;
   air intake and exhaust means disposed on either side of said second valve and in communication with said annular space;
   combustion means including fuel injection means, a combustion chamber and ignition means disposed in said housing proximate said third rotary valve member, said combustion chamber being communicable with said annular space between said second valve member and said third valve member;
   means in said housing engageable with said rotary valve members to limit movement of said valve members in one direction of rotation, means on one of said rotary valve members engageable with said housing for limiting movement of said rotary valve member in the other direction of rotation.

2. An engine in accordance with claim 1 wherein an air inlet conduit is disposed between said combustion chamber and said first rotary valve to be communicative with said annular space when said first valve is in said first position and blocked from communication with said annular space when said first valve is in said second position.

3. An engine in accordance with claim 2 wherein said combustion chamber is communicative with said annular space through a fuel inlet bore and wherein a fourth rotary valve is disposed in said fuel inlet bore, means to oscillate said fourth rotary valve from a first position blocking communication therethrough, and a second position providing communication therethrough.

4. An engine in accordance with claim 3 wherein said means to oscillate said rotary valves comprise cam and push rod means associated with said rotor and each of said valves.

5. An engine in accordance with claim 4 wherein means are provided to selectively block operation of said rotary valves in said second position.

6. An engine in accordance with claim 5 wherein said means to block operation of said valves comprises fluid actuated push rod lifters associated with each of said push rods, an engine actuated fluid pump connected to said actuators and means to provide for fluid actuation of said actuators upon rotation of said rotor above a predetermined speed.

References Cited

UNITED STATES PATENTS

| | | | |
|---|---|---|---|
| 1,242,693 | 10/1917 | Hibner | 123—15 |
| 2,043,518 | 6/1936 | Rice et al. | 123—15 |
| 2,250,484 | 7/1941 | Jutting | 123—15 |
| 3,220,388 | 11/1965 | Trotter | 123—15 |

FOREIGN PATENTS

| | | |
|---|---|---|
| 1,320,880 | 2/1963 | France. |

C. J. HUSAR, Primary Examiner